United States Patent [19]

Bayan et al.

[11] Patent Number: 5,093,423
[45] Date of Patent: Mar. 3, 1992

[54] METHOD OF MAKING SBR THERMOPLASTIC ELASTOMERS

[75] Inventors: Ghawamedin Bayan, West Chester; Anthony S. Esposito, Pottstown, both of Pa.

[73] Assignee: The West Company, Incorporated, Phoenixville, Pa.

[21] Appl. No.: 586,908

[22] Filed: Sep. 24, 1990

[51] Int. Cl.$^5$ .............................................. C08L 53/00
[52] U.S. Cl. ........................................ 525/99; 525/95
[58] Field of Search ................................... 525/99, 95

[56] References Cited

U.S. PATENT DOCUMENTS 4,197,377  4/1980  Bohm et al. ........................... 525/99
5,017,436  5/1991  Schwartz et al. ..................... 428/519

Primary Examiner—Melvyn I. Marquis
Assistant Examiner—D. E. Aylward
Attorney, Agent, or Firm—Eugene E. Renz, Jr.

[57] ABSTRACT

A method of making a thermoplastic elastomer composition produced by dynamic vulcanization of SBR as a dispersed phase of cross linked SBR, and a co-continuous matrix of SEBS and polypropylene. The dynamic vulcanization step takes place under conditions of shear and temperature to reach the decomposition point of crosslinked SBR, at which time the crosslinking reaction is quenched. Compositions of superior properties are achieved using this method.

10 Claims, No Drawings

METHOD OF MAKING SBR THERMOPLASTIC ELASTOMERS

FIELD OF THE INVENTION

The present invention relates to a method for making a SBR based dynamically vulcanized thermoplastic elastomer which can be used in the pharmaceutical industry and consumer and health care industries for a variety of products such as, for example, vial stoppers, dropper bulbs, gaskets, o-rings and syringe tips.

BACKGROUND OF THE INVENTION

Elastomeric compositions in which styrene-butadiene rubber, hereinafter SBR, and a thermoplastic olefin resin such as polypropylene are combined have resulted in thermoplastic compositions. These materials have been proposed for use in some applications where thermoplastic elastomers would be of advantage.

However, many of the products produced by the dynamic vulcanization of SBR in the presence of materials such as polypropylene have not resulted in products which are suitable form some applications, for example, in the pharmaceutical industry. These materials lack cleanliness, high temperature stability or autoclave set.

Because of extremely high quality control and concern for the integrity of the product contained in pharmaceutical containers, thermoplastic elastomers have been slow to be accepted as candidates for container closures, vial stoppers, dropper bulbs and the like. The product must have a high tensile strength and set resistance properties, be soft and thermally stable, and must be easy to process. Of particular need is a material which has a low autoclave set which would be of value as a candidate for pharmaceutical packaging. Until the present time, a method for making such a material has not been developed which has all the many required properties for use successfully in the pharmaceutical industry.

U.S. Pat. No. 4,104,210 and U.S. Pat. No. 4,271,049, both describe two component systems in which high unsaturation diene rubbers and thermoplastic olefins are blended. Two component systems are shown in which SBR is dispersed in polypropylene, where polypropylene is the continuous phase.

U.S. Pat. No. 4,197,377 describes a thermoplastic elastomer blend which about 10 to about 48 parts of a polyolefin such as polypropylene is employed, from 90 to about 10 parts by weight of SBR and a compound selected from triblock copolymers, diblock copolymers and polystyrene. The diblock copolymer is a styrene-butadiene copolymer and the triblock copolymer is a strene-butadiene copolymer. The amount of this third component ranges from about 0.1 to about 80 parts by weight.

U.S. Pat. No. 4,250,273 describes a blend of uncured or partially cured mixtures of SBR, 1-olefine polymers or copolymers and highly saturated elastomers. One example of the highly saturated elastomer is polyisobutylene. The tri-blend of materials generally has the 1-olefin polymer or copolymer and the SBR rubber in the continuous phase.

U.S. Pat. No. 4,340,684 describes thermoplastic elastomeric blends of 1-olefin polymers, SBR rubbers and highly saturated elastomers and is a divisional of the previously mentioned U.S. Pat. No. 4,250,273. Similarly, U.S. Pat. No. 4,350,795 is a divisional of that same patent.

All three of these patents relate to tri-blends in which the 1-olefin polymer or copolymer and the SBR are in the continuous phase. U.S. Pat. No. 4,385,142 is related to these previously described patents, but further include from about 5 to about 50 parts by weight of bitumen.

None of the prior art formulations which are described in those patents have the appropriate high tensile strength and set resistance properties that are desired while also being soft and thermally stable. Methods in which SBR is dynamically vulcanized in the presence of polypropylene and other polyolefins have not resulted in thermoplastic elastomers would be of advantage. None of these method are capable of providing the ideal composition for use in the pharmaceutical industry.

Accordingly, it is an object of this invention to provide a method of making a thermoplastic elastomer composition which is suitable for use as a product in the pharmaceutical industry and which is useful in other application where high tensile strength, low compression set, and thermally stable soft processable materials are desirable.

Other objects will appear hereinafter.

SUMMARY OF THE INVENTION

The present invention provides a method for making a thermoplastic elastomer composition in which SBR is the dispersed phase in a co-continuous matrix of polypropylene and SEBS. The SEBS has a molecular weight of at least 100,000. These compositions have properties which are highly desirable for use in the pharmaceutical industry.

Specifically, the present invention comprises dynamic vulcanization of SBR in which the dispersed phase is cross linked SBR and the co-continuous matrix is comprised up of to about 60 parts of SEBS and up to about 30 parts of polypropylene per 100 parts of SBR, whereby a thermoplastic elastomer is produced. After a homogeneous mixture of the co-continuous phases is prepared, a catalyst is added which initiates the crosslinking reaction where the SBR undergoes a phase inversion. SBR fully cured rubber forms discrete particles in the still co-continuous phases of SEBS and polypropylene. The reaction is allowed to proceed until the SBR reaches a decomposition point. The clearest way to determine this point is to notice the formation of acrolein, such as by its distinctive odor.

The next step involves quenching the reaction to prevent substantial decomposition. When free radical catalysts are used, free radical scavengers can be used. Mixing is continued to complete the quench.

DETAILED DESCRIPTION OF THE PREFERRED EMBODIMENTS

Any of the commercially available butadiene styrene rubbers may be used as the SBR component. SBR, a butadiene styrene rubber, is a random copolymer made from monomers of butadiene and styrene. The copolymer may be prepared in any of the well know conventional processes, such as through solution or emulsion polymerization. The amount by weight of butadiene may vary from as little as less than 60 percent by weight to more than 90 percent by weight, based upon the total weight of the copolymer. Even larger or smaller amounts of butadiene may be employed. The butadiene portion may contain as high as 90 or even 100% of, 1, 2-polybutadiene or 1, 4-polybutadiene. The molecular weight, on a number average value, may be less than 50,000 and greater than one million. Preferred as SBR rubber is Duradene rubber manufactured by Firestone Tire and Rubber Company. A suitable catalyst is a peroxide catalyst such as Lupersol 101, made by Pennwalt Corp., in combination with an initiator HVA-2, made by DuPont Company.

Prior to cross linking, the SBR rubber is in a continuous phase and the other components are added to form homogeneous co-continuous phases. During cross linking of the SBR rubber, it becomes dispersed and, upon vigorous mixing, becomes particulated throughout the remaining co-continuous phase of the mixture of polypropylene and SEBS.

Polypropylene is one of the two components which makeup the co-continuous matrix into which the SBR becomes dispersed while cross linking in the dynamic vulcanization process. The compositions of this invention have up to 30 parts of polypropylene, and preferably between about 5 and about 30 parts of polypropylene per 100 parts of SBR. A preferred range of this component is from about 10 to about 20 parts by weight of polypropylene.

The other component of the co-continuous matrix in which the SBR is dynamically vulcanized is an ethylene, butylene block copolymer having terminal polystyrene units, which polymers are referred to by the shorthand designation of SEBS copolymers. SEBS copolymers are added to the unvulcanized SBR along with the polypropylene in an amount up to about 60 parts SEBS. Preferred is about 10 to about 60 parts of SEBS, based upon 100 parts of SBR. Most preferred is a range of about 10 to about 30 parts of SEBS per 100 parts of SBR. The molecular weight of the SEBS is at least 100,000 in order to achieve maximum properties but it is possible to make products with a somewhat lower molecular weight if lower tensile strength or high compression set can be acceptable.

SEBS, the ethylene, butylene block copolymers having terminal polystyrene units, functions as a thermoplastic elastomer. These polymers are commercially available from Shell Chemical Company under the trademark KRATON G. Block copolymers described in U.S. Pat. No. 3,686,364 and U.S. Pat. No. 3,865,776 are typical examples of the block copolymers contemplated by the present invention. In the latter patent, assigned to Shell Oil Company, copolymers are described as having ethylene, butylene central blocks of from 50 to 80% by weight of the copolymer molecule in approximately equal proportions of ethylene and butylene. The terminal blocks are polystyrene. All of these materials are generically referred to as SEBS copolymers.

A number of experiments were performed to demonstrate the efficacy of the present invention. In these experiments, dynamic vulcanization of SBR was effected using polypropylene and SEBS as the co-continuous matrix. The vulcanization continued until decomposition of the SBR began. A quench agent was added at this point. Suitable free radical scavengers are Sandostab PEP-Q, made by Sandoz Corp. or Irganox-1076, made by Ciba Geigy. To evaluate the effectiveness of the compositions, particularly as a potential candidate for the pharmaceutical industry rubber products, tensile strength and compression set were measured using standard testing techniques.

In each of the experiments performed and described herein, the method of this invention was used to dynamically vulcanize the SBR in the co-continuous matrix. The SBR, polypropylene and SEBS were charged to a Brabender mixer having 250 cc volume. The mixer was equipped with Banbury blades. At this point in the procedure, other material normally used in thermoplastic elastomer formulations, such as plasticisers, fillers antioxidents, coloring agents, and the like may be added if desired.

The mixtures were mixed at a temperature of 180° C., which is above the melting point of the plastic phase, for seven (7) minutes or until a homogeneous mix is obtained. In this series of experiments, a dual curing system was used. The first agent, HVA-2, which is m-phenylenebismaleimide, was added at the beginning of the mixing cycle.

Because of shear action, the temperature of the mixture rises to about 180° C. as a homogeneous mix was obtained. At this time, when the temperature of the mixture reached 180° C., a peroxide curing agent Lupersol 101, was quickly added to the mixture while intensive mixing is taking place. The torque and temperature rose to higher levels and the temperature of the mixture was controlled at 195° C. by controlling the rotor speed. Specifically, after 1 minute at 100 rpm, when the 195° C. temperature was reached and mix viscosity had peaked, the mixing speed was reduced to 60 rpm. Two (2) minutes after the peroxide incorporation and one minute after viscosity peak, a scavenger was added to scavenge the unused free-radicals and quench the reaction. Sandostab PEP-Q which is a commercially available scavenger for free-radicals, was used. Irqanox 1076 is also effective. At this point, decomposition of the SBR had begun. The mixing was continued after the addition of the scavenger for two (2) additional minutes before the mixture was removed from the Brabender. During this time, the odor of acrolein, a byproduct formed during decomposition of crosslinked SBR, was noticeable.

The resulting thermoplastic elastomer composition, including a dispersed phase of cross linked SBR and a co-continuous matrix of SEBS and polypropylene, was then molded into test portions. In the series of experiments described herein, the mixture from the Brabender was compression molded at 195° C. for approximately fourteen (14) minutes. ASTM testing methods were used to evaluate the physical properties. For tensile strength, at break at 20 inches per minute, ASTM D412 test method was used. For compression set at 70° C. per 22 hour, Method B of ASTM D 395 was used.

In the first ten experiments, the amount of polypropylene was varied from 10 parts per hundred parts of SBR to as much as 30 parts of polypropylene per 100 parts of SBR. Similarly, the amount of SEBS ranges from 10 parts to 50 parts per 100 parts of SBR. In all of these experiments, the compression set is exceptionally good, being below 30%. Similarly, in all but one experiment, the tensile strength was at least 1000 PSI, indicating that a strong product is produced. These results are presented in Table I.

Also shown in Table I are experiments 11, 12 and 13, in which the effect of using additional SEBS, additional polypropylene, or additional quantities of both materials is shown to have a negative affect on the compression set values.

Finally, in Table I are experiments where the crosslinking of the SBR did not reach the decomposition point (14) or substantially exceeded the decomposition point (15).

TABLE I

| Experiment Number | Polypropylene PHR | SEBS PHR | Compression Set, % | Tensile PSI |
| --- | --- | --- | --- | --- |
| 1 | 10 | 50 | 23 | 480 |
| 2 | 17 | 50 | 28 | 1000 |
| 3 | 17 | 30 | 24 | 1100 |
| 4 | 17 | 17 | 18 | 1000 |
| 5 | 17 | 10 | 20 | 1000 |
| 6 | 20 | 20 | 20 | 1080 |
| 7 | 20 | 30 | 25 | 1200 |
| 8 | 30 | 50 | 29 | 1250 |
| 9 | 30 | 30 | 27 | 1460 |
| 10 | 30 | 10 | 27 | 1110 |
| 11 | 17 | 100 | 32 | 1100 |
| 12 | 40 | 30 | 32 | 1800 |
| 13 | 80 | 80 | 37 | 2700 |
| 14 | 17 | 17 | 25-28 | 400-600 |
| 15 | 17 | 17 | charred-did not mold | |

Clearly, the failure of the crosslinking process to reach but no substantially exceed the decomposition point for SBR resulted in substantially inferior properties in the final product. The unquenched reaction charred and could not be molded.

Compositions of the type described and claimed herein have been formulated into syringe plunger tips, gaskets, and vial stoppers. All of them have demonstrated acceptable properties for use in the pharmaceutical industry, particularly good strength and compression set. Resistance to damage during steam autoclaving and radiation sterilization is also a particular advantage of the present invention.

While particular embodiments of the present invention have been illustrated and described herein, it is not intended to limit the invention and changes and modifications may be made therein within the scope of the following claims.

What is claimed is:

1. A method of making SBR thermoplastic elastomers, comprising the steps of:
    mixing a quantity of SBR, SEBS and polypropylene to form a homogeneous mixture of co-continuous phases;
    catalyzing said mix by adding a curing agent to cause said SBR to crosslink while continuously mixing at sufficient shear to cause phase inversion of the SBR to form a discrete phase of small particle crosslinked fully cured SBR in a co-continuous phase of SEBS and polypropylene, said continuous mixing taking place at a temperature and for a time sufficient to reach the decomposition point of crosslinked SBR; and
    quenching the crosslinking reaction of said SBR to prevent substantial decomposition of said SBR while continuing said mixing to complete dispersion of said discrete phase of SBR in said co-continuous phase of SEBS and polypropylene.

2. The method of claim 1 wherein said curing agent is a free radical catalyst.

3. The method of claim 2 wherein said quenching is accomplished by adding a free radical scavenger.

4. The method of claim 1 wherein said mixing and crosslinking step is carried out for sufficient time for the temperature to reach at least 195° C. prior to said quenching step.

5. The method of claim 1 wherein said decomposition point is determined by determining the presence of acrolein in the mixture.

6. The method of claim 1 wherein the amount of SEBS ranges from about 10 to about 60 parts of SBR.

7. The method of claim 1 wherein the amount of polypropylene ranges from about 10 to about 30 parts per 100 parts of SBR.

8. A method of making SBR thermoplastic elastomers, comprising the steps of:
    mixing a quantity of SBR, SEBS and polypropylene to form a homogeneous mixture of co-continuous phases; curing said mix by adding a free radical curing agent to cause said SBR to crosslink while continuously mixing at sufficient shear to cause phase inversion of the SBR to form a discrete phase of small particle crosslinked fully cured SBR in a co-continuous phase of SEBS and polypropylene, said continuous mixing taking place at a temperature which increases up to 195° C. and for a time sufficient to reach the decomposition point of crosslinked SBR as determined by the pressure of acrolein in the mixture; and
    quenching the crosslinking reaction of said SBR by adding a free radical scavenger to prevent substantial decomposition of said SBR while continuing said mixing to complete dispersion of said discrete phase of SBR in said co-continuous phase of SEBS and polypropylene.

9. The method of claim 8 wherein the amount of SEBS ranges from about 10 to about 60 parts of SBR.

10. The method of claim 8 wherein the amount of polypropylene ranges from about 10 to about 30 parts per 100 parts of SBR.

* * * * *